No. 787,863. PATENTED APR. 18, 1905.
J. L. SPENCER.
VARIABLE SPEED GEARING.
APPLICATION FILED OCT. 14, 1902.
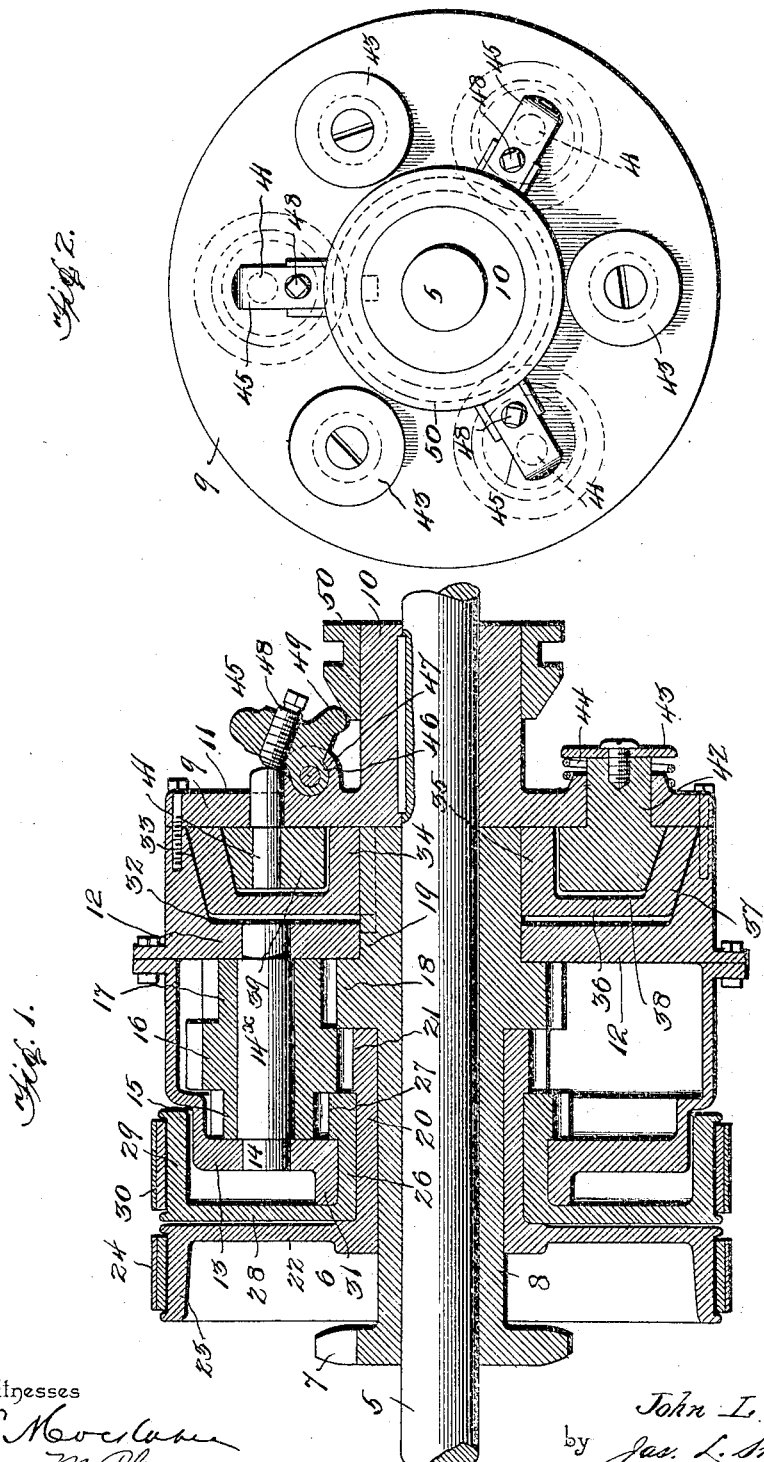
Witnesses
Inventor.
John L. Spencer
by Jas. L. Skidmore
his Attorney.

No. 787,863. Patented April 18, 1905.

UNITED STATES PATENT OFFICE.

JOHN L. SPENCER, OF ELMIRA HEIGHTS, NEW YORK.

VARIABLE-SPEED GEARING.

SPECIFICATION forming part of Letters Patent No. 787,863, dated April 18, 1905.

Application filed October 14, 1902. Serial No. 127,272.

*To all whom it may concern:*

Be it known that I, JOHN L. SPENCER, a citizen of the United States, residing at Elmira Heights, in the county of Chemung and State of New York, have invented certain new and useful Improvements in Variable-Speed Gearing; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in variable-speed gearing, the object being to provide a device by means of which various speeds in a forward direction or a slow speed in a reverse direction may be obtained from a suitable driving member without varying the speed of the driving member.

A further object is to provide a novel clutch mechanism which will enable a ready positive connection between the driving and driven members, thereby making a uniform speed between the two members.

To these and other ends, the nature of which will be readily understood as the invention is hereinafter described, said invention consists in the improved construction and combination of parts hereinafter fully described, illustrated in the accompanying drawings, in which similar numerals of reference indicate similar parts, and particularly set forth in the accompanying claims.

In the drawings, Figure 1 is a central vertical sectional view of the device, taken longitudinally of the shaft. Fig. 2 is an end elevation of the gear-casing and showing the clutch-operating mechanism.

In the drawings, 5 designates the driving-shaft operatively connected with a suitable driving mechanism, and 6 designates the driven member, in the present case comprising a sprocket-wheel 7, carried by a sleeve 8, loosely mounted on the shaft 5.

9 designates a casing having at one end a boss or sleeve 10, which is keyed or otherwise secured to the shaft 5. Said casing is formed in three sections or portions, substantially as shown in the drawings, being provided with a face 11 extending outwardly from the boss or sleeve 10, the body of the casing extending longitudinally of the shaft 5, said body portion being provided with two spaced inwardly-projecting flanges 12 and 13, said flanges having their inner peripheries in loose contact with parts hereinafter described. The flanges 12 and 13 form bearings for a series of shafts or spindles 14, each spindle being surrounded by a sleeve $14^\times$, and on each sleeve is mounted a series of gears 15, 16, and 17, said gears being so arranged as to have a movement as a unitary structure. Such movement may be obtained by forming the gears integral with one another, or the gears may be connected together by a feather or other suitable mechanism, and said gears may have a loose or fast engagement with its shaft, as desired. But one shaft 14 and its gears is shown in the drawings, it being understood, however, that more than one (preferably three) series of such shafts, &c., may be used, all having the same relative position to the casing.

The gears 15, 16, and 17 are of different diameters, the gear 15 having the smallest diameter, the gear 16 the largest diameter, and the gear 17 a diameter intermediate that of the gears 15 and 16.

The sleeve 8 of the driven member is provided with a gear 18, which has an operative engagement with the gear 17, said sleeve having a shoulder 19 adjacent to the gear 18, on which the flange 12 is supported with a loose contact.

Mounted loosely on the sleeve 8 is a sleeve or shell 20, one end of which is provided with an external gear 21, operatively connected with the gear 16, said shell having an outwardly-extending flange 22, the outer periphery of which is provided with a laterally-projecting flange 23, upon which a tightening device 24 of suitable form is adapted to operate.

Loosely mounted on the sleeve 20 is a sleeve 26, the inner end of which carries an external gear 27, having an operative engagement with the gear 15, the other end of said sleeve having an outwardly-extending flange 28, provided at its outer periphery with a laterally-extended flange 29, upon which a tightening device 30 is adapted to operate.

The sleeves 20 and 26 are preferably arranged as shown in the drawings, by means of which they may be said to be "nested" together, while the flange 13 of the casing is provided with a projection 31, which substantially fills the space between the flange 28 and the gear 27, the several parts by this construction being substantially held against movement longitudinally of the casing.

It will be understood that my invention includes a shaft having a clutching member fixed thereto, a second shaft also provided with a clutching member, the latter adapted to engage with the first-named clutching member. The said second shaft is provided with a fixed gear and a plurality of loose gears, and means is provided for holding said loose gears. A compound planetary pinion is journaled in bearings carried by the first-above-named shaft, said planetary pinion having its differentials in engagement with the pinions on said second shaft. I also provide a substantially oil-proof inclosing means for the aforesaid clutching members and gears.

The above-described construction, in connection with a suitable clutch mechanism for connecting the casing and the sleeve 8 (the driving and driven members) positively, constitutes the variable-speed gearing.

The various changes in speed are obtained by the manipulation of the several parts in the following manner: The clutch mechanism and the sleeves 20 and 26 being free from the tightening devices, the rotation of the shaft 5 causes the casing 9 to be rotated therewith, such movement causing the shafts 14 to move in a circle around the shaft 5. During this movement the sprocket-wheel 7, being subject to the action of the driven mechanism to which it is connected, will remain stationary, the gear 17 having a rolling contact with the gear 18, there being no direct connection between the casing and the sleeve 8 to cause the latter to be driven. As the gears 16 and 21 and 15 and 27 are also in engagement, this movement will impart independent movement to the sleeves 20 and 26, but without effect on any of the operating parts of the mechanism. If a slow forward movement of the driven member is desired, the tightening device 24 is brought into operation, this movement causing the sleeve 20 to become stationary. This immediately produces a rolling contact between the gears 16 and 21, causing the series of gears to revolve on their axis at a speed controlled by the speed of the gear 16. This rotation of the gear 16 causes the gear 17 to rotate therewith, the latter operating in connection with the gear 18 of larger diameter than the gear 21 and causes the gear 18 to be moved in a forward direction at a less speed than that at which the casing is moving.

This is due to the fact that the gear 21 being stationary and relatively the equivalent of a reverse movement to that of the casing the gear 18 will also be driven in a relatively reverse direction, but at less speed, than that of the gear 21. As the latter is stationary, the movement of the gear 18 will be forwardly, but at a reduced speed. To obtain a slow reverse movement with the parts running free, the tightening device 30 is brought into operation with the flange 29, causing the sleeve 26 to remain stationary, or, as above explained in connection with the sleeve 20, giving a relatively reverse movement to the sleeve 26. This causes a rolling contact between the gears 15 and 17, the movement of the series of gears being controlled by the movement of the gear 15. As the gear 17 is of larger diameter than that of the gear 15, the part coöperating therewith (the gear 18) will also have a relatively reverse movement to that of the casing greater than that of the gear 27. The latter being stationary, the increased reverse movement of the gear 18 will cause the sleeve 8 to be driven in a direction reverse to that of the shaft 5 and at a slow speed. To obtain a maximum forward movement, the sleeve 8 and casing 9 are positively connected together by the clutch mechanism, causing the parts to move in unison independent of the gear connection, and thereby relieving the gear from wear.

Any suitable clutch mechanism may be used in connection with the gearing above described, it being desirable, however, that the engagement between the clutch mechanism and the sleeve 8 be located within the casing 9, the sleeve 8 having its forward end abutting against or in close proximity to the sleeve 10 of the casing. It is preferred, however, to use the clutch mechanism shown in the drawings, inasmuch as the casing 9 constitutes one of the members of the clutch, and the clutch-faces are entirely inclosed, and therefore free from any liability of the entrance of dust, &c. In providing this clutch mechanism an annular space 32 is formed within the casing 9, between the flange 12 and the face 11, the inner periphery of the casing being flared, as at 33, the widest diameter of the space being adjacent to the inner side of the face 11. Within the space 32 is located the friction-shoe 34, comprising a hub 35, keyed or otherwise secured to the sleeve 8, a flange 36, extending outwardly from the hub, and the laterally-extending flange 37, the latter having a shape to correspond with that of the flared portion 33 of the casing. The flange 37 has its inner and outer faces parallel with each other. The flange 36 joins the hub 35 and flange 37 at one side, thereby providing an annular space 38 between the face 11 and flange 36 and the hub 35 and flange 37, the latter flange being flared, as shown. Within this space is located an annular shoe 39, having its outer periphery of a shape to correspond with the inner face of the flange 37. The shoe 39 is provided with a plurality of pins 41, which extend through openings formed in the face 11, and is further provided with projecting portions 42, the outer ends of which are provided with a washer 43, between which and the face 11 is interposed a spring 44. The portions 42 are preferably arranged as shown in Fig. 2 and normally hold the shoe 39 in close contact with the inner side of the face 11 and out of contact with the shoe 34.

45 designates a pivoted clutch-operating member, preferably formed as shown in the drawings, having a lug 46 pivotally mounted in a bearing 47, formed on the face 11, said member having a screw-threaded adjusting-pin 48, the rear end of which operates against the face of the pin 41. A bearing-face 49 is formed on the member 45, which operates on the inclined surface of the sliding member 50 of usual form, the latter having means for moving it longitudinally of the shaft 5, said member 50 being keyed or otherwise secured to the shaft 5. It is to be understood that the number of members 45 corresponds with the number of pins 41.

With the member 50 in the position shown in Fig. 1 the shoe 39 will be in inoperative position relative to the shoe 34, and as the latter is carried by the sleeve 8 there will be no frictional engagement between the shoe 34 and the face 33 of the casing. When, however, the member 50 is moved toward the face 11, the members 45 will be moved on their pivots to cause the pins 48 to move the pins 41 inwardly, and thereby force a contact of the shoes 39 and 34, moving both of said shoes inwardly until a frictional engagement is formed between the shoe 34 and the face 33. When the member 50 is returned, the springs 44 throw the shoe 39 out of frictional engagement with the shoe 34 and destroys the clutch engagement. From this it will be seen that the clutching-faces are not only carried within the casing, and thereby protected, but that the clutching member 34 is in frictional contact with two faces, both of which are carried by the casing and having a movement therewith, such double engagement forming an efficient connection between the several parts of the mechanism.

Having thus described my invention, what I claim as new is—

1. A variable-speed gearing comprising a driving member; a casing carried thereby and having a common movement therewith; a driven member; gears carried by said casing; and sleeves carried by the driven member, said sleeves having an operative connection with said gears; and independent retarding means for each sleeve, whereby a positive connection may be made between the driving and driven members through said gears.

2. A variable-speed gearing comprising a driving member; a casing carried thereby and having a common movement therewith; a driven member; gears carried by said casing; sleeves carried by the driven member, said sleeves having an operative connection with said gears; independent retarding means for each sleeve, whereby a positive connection may be made between the driving and driven members through said gears; and a clutch mechanism for connecting the driving and driven members independent of the gears.

3. A variable-speed gearing comprising a driving member; a casing carried thereby and having a common movement therewith; a driven member; gears carried by said casing; sleeves carried by the driven member, said sleeves having an operative connection with said gears; independent retarding means for each sleeve, whereby a positive connection may be made between the driving and driven members through said gears; and a clutch mechanism for connecting the driving and driven members independent of the gears, the clutch-faces being located within the casing.

4. A variable-speed gearing comprising a shaft; a casing carried thereby and having a common movement therewith, said casing having spaced inwardly-extending flanges; a driven member, a sleeve loosely mounted on said shaft carrying the driven member, said sleeve having an external gear; gears of different diameters carried by said casing between said flanges, one of said gears having an operative engagement with the gear of said sleeve; and sleeves loosely mounted concentrically on said first-mentioned sleeve, said sleeves having an operative engagement with the remaining gears; and independent retarding means for each sleeve, whereby a positive connection may be made between the driving and driven members through said gears.

5. A variable-speed gearing comprising a shaft; a casing carried thereby and having a common movement therewith, said casing having spaced inwardly-extending flanges; a driven member, a sleeve loosely mounted on said shaft, carrying the driven member, said sleeve having an external gear; gears of different diameters carried by said casing between said flanges, one of said gears having an operative engagement with the gear of said sleeve; sleeves loosely mounted concentrically on said first-mentioned sleeve, said sleeves having an operative engagement with the remaining gears; independent retarding means for each sleeve, whereby a positive connection may be made between the driving and driven members through said gears; and a clutch mechanism carried by said casing.

6. A variable-speed gearing, comprising a driving member; a casing carried thereby, and having a common movement therewith; a driven member; gears carried by said casing; sleeves carried by the driven member and having an operative connection with said gears;

retarding means for each sleeve, and a clutch mechanism carried by said casing.

7. A variable-speed gearing, comprising a driving member; a casing carried thereby, and having a common movement therewith; a driven member; gears carried by said casing; sleeves carried by the driven member, and having an operative connection with said gears; independent retarding means for each of said sleeves; and a clutch mechanism carried by said casing the clutching-faces thereof being located within the casing.

8. A variable-speed gearing, comprising a driving member; a casing carried thereby, and having a common movement therewith; a driven member; gears carried by said casing; sleeves carried by the driven member, and having an operative connection with said gears; retarding means for each of said sleeves; and a clutch mechanism carried by said casing the clutching-faces of which are located within the casing, one of said faces being formed on the casing.

9. A variable-speed gearing, comprising a driving member; a casing carried thereby, and having a common movement therewith; a driven member; gears carried by said casing; sleeves carried by the driven member, and having an operative connection with said gears; retarding means for each of said sleeves; a clutch mechanism carried by said casing, having its clutching-faces, located within the casing, one of said faces being formed on the casing; and a clutch-operating device carried by the casing adapted to move the clutch-faces into frictional engagement.

10. The combination with a driving-shaft, of two gears independently revoluble upon said shaft; a driven member so connected with one of said gears as to be revoluble therewith; means adapted to hold the other gear against rotation; gearing connections between said gears; and a support revoluble with said shaft, adapted to revolubly support said gearing connections; whereby said driven member may revolve independently of said driving-shaft, or be driven at a lower speed than that of said shaft.

11. The combination with a driving-shaft of a fly-wheel so attached to said shaft as to revolve therewith; two gears within said fly-wheel and independently revoluble upon said shaft; a driven member connected with one of said gears so as to be revoluble therewith; means adapted to hold the other said gear against rotation; and gearing connections between said gears, revolubly supported by and within said fly-wheel.

12. The combination with a driving-shaft, of two concentric sleeves independently revoluble upon said shaft; a gear attached to each of said sleeves; a driven member attached to one of said sleeves, and revoluble therewith; means for holding the other sleeve against rotation; gearing connections between said gears on said sleeves; and a support, revoluble with the driving-shaft adapted to revolubly support said gearing connections.

13. The combination with a driving-shaft, of concentric sleeves independently revoluble upon said shaft, two gears attached to said sleeves respectively; a sprocket attached to one sleeve, a brake-wheel attached to the other sleeve, means for holding said brake-wheel against rotation, a fly-wheel attached to said driving-shaft and revoluble therewith, two gears revolubly supported in said fly-wheel and adapted to mesh with said gears attached to said sleeves, and means for connecting said gears carried in said fly-wheel, whereby they revolve together.

14. A transmission-gear mechanism comprising a set of differential pinions, a support therefor, a revoluble shaft, a pinion fixed on said shaft and engaging one of said differential pinions, a pinion engaging one of said differential pinions and having a sleeve loose on said shaft, mechanism for holding said sleeve, a pinion engaging one of said differential pinions and having a sleeve loose on said first sleeve, and mechanism for holding said second sleeve, substantially as specified.

15. A transmission-gear mechanism comprising a set of differential pinions, a support therefor, a revoluble shaft, a pinion fixed on said shaft and engaging one of said differential pinions, a pinion engaging one of said differential pinions and having a sleeve loose on said shaft, a clutch mechanism connected with said sleeve for holding the same, a pinion engaging one of said differential pinions and having a sleeve loose on said first sleeve and a clutch mechanism connected with said second sleeve for holding the same, substantially as specified.

16. A transmission-gear mechanism comprising a set of differential pinions, a support therefor, a revoluble shaft, a pinion fixed on said shaft and engaging one of said differential pinions, a pinion engaging one of said differential pinions and having a sleeve loose on said shaft, a brake-wheel connected with said sleeve, a brake-band for holding said brake-wheel, a pinion engaging one of said differential pinions and having a sleeve loose on said first sleeve, a brake-wheel connected with said second sleeve, and a brake-band for holding said second brake-wheel, substantially as specified.

17. A transmission-gear comprising a compound planetary pinion, a support therefor, a revoluble shaft, an externally-toothed pinion fixed on said revoluble shaft and engaging said planetary pinion, an externally-toothed pinion engaging said planetary pinion, and having a sleeve loose on said shaft, a wheel fixed to said sleeve, an externally-toothed pinion engaging said planetary pinion and having a sleeve loose on said first sleeve, a wheel fixed to said second sleeve, and mechanism for holding said wheels, substantially as specified.

18. A speed-changing mechanism comprising a cylindrical casing, a clutching member fixed therein, a shaft having a clutching member fixed thereto to engage said first clutching member, members for engaging and disengaging said clutching members, planetary gearing, gearing carried by said shaft and engaging said planetary gearing, and a cylindrical casing connected with said first casing and inclosing said gearing, substantially as specified.

19. A speed-changing mechanism comprising a shaft, a clutching member fixed thereto, a second shaft, a clutching member fixed to said second shaft and adapted to engage with said first clutching member, a gear fixed on said second shaft, a plurality of gears loose on said second shaft, mechanism for holding said loose gears, a compound planetary pinion journaled in bearings carried by said first shaft and having its differentials in engagement with the pinions on said second shaft, and a substantially oil-proof inclosing mechanism for said clutching members and gears, substantially as specified.

In testimony whereof I affix my signature in presence of two witnesses.

JOHN L. SPENCER.

Witnesses:
   Lena Spencer,
   Floyd L. Jackson.